(12) United States Patent
Carapelli

(10) Patent No.: US 9,377,332 B2
(45) Date of Patent: Jun. 28, 2016

(54) VISCOSITY DEPENDENT FLOW METER FOR USE IN FUEL DISPENSING ENVIRONMENTS

(71) Applicant: Gilbarco, Inc., Greensboro, NC (US)

(72) Inventor: Giovanni Carapelli, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 23 days.

(21) Appl. No.: 14/211,358

(22) Filed: Mar. 14, 2014

(65) Prior Publication Data

US 2014/0260674 A1   Sep. 18, 2014

Related U.S. Application Data

(60) Provisional application No. 61/787,250, filed on Mar. 15, 2013.

(51) Int. Cl.
*G01F 1/05* (2006.01)
*G01F 1/10* (2006.01)

(52) U.S. Cl.
CPC .................................. *G01F 1/10* (2013.01)

(58) Field of Classification Search
CPC ............. G01F 15/00; G01F 1/05; G01F 1/08; G01F 1/12; G01F 23/00
USPC ........ 73/861.79, 861.77, 861.82, 861.84, 300
See application file for complete search history.

(56) References Cited

U.S. PATENT DOCUMENTS

| 4,876,653 | A | 10/1989 | McSpadden et al. | |
|---|---|---|---|---|
| 5,016,187 | A | 5/1991 | Forkert et al. | |
| 5,464,466 | A | 11/1995 | Nanaji et al. | |
| 5,689,071 | A | 11/1997 | Ruffner et al. | |
| 5,831,176 | A * | 11/1998 | Morgenthale et al. | 73/861.77 |
| 5,876,610 | A * | 3/1999 | Clack et al. | 210/739 |
| 5,877,430 | A * | 3/1999 | Peace et al. | 73/861.82 |
| RE36,401 | E * | 11/1999 | Fitzpatrick et al. | 73/300 |
| 5,985,002 | A | 11/1999 | Grantham | |
| 6,692,535 | B2 * | 2/2004 | Olivier | 73/861.79 |
| 6,708,573 | B1 | 3/2004 | Cohen et al. | |
| 6,854,342 | B2 | 2/2005 | Payne et al. | |
| 6,996,485 | B2 | 2/2006 | Payne | |
| 8,096,446 | B2 * | 1/2012 | Carapelli | 222/91 |
| 8,381,597 | B2 | 2/2013 | Carapelli | |
| 2003/0145662 | A1 | 8/2003 | Olivier | |

(Continued)

FOREIGN PATENT DOCUMENTS

| EP | 1398603 A2 | 3/2004 |
|---|---|---|
| GB | 2281064 A | 2/1995 |

(Continued)

OTHER PUBLICATIONS

International Search Report and Written Opinion mailed Jul. 18, 2014 in corresponding international application No. PCT/US2014/030172.

*Primary Examiner* — Jewel V Thompson
(74) *Attorney, Agent, or Firm* — Nelson Mullins Riley & Scarborough, LLP

(57) ABSTRACT

A system and method of measuring volumetric flow through a meter. One step of the method involves providing a flow meter connected to a duct having fluid flowing therethrough. A memory having at least two Roshko/Strouhal curves stored therein is also provided. A viscosity of the fluid is measured. One of the Roshko/Strouhal is selected curves based on the method viscosity. A volumetric flow through the meter is determined utilizing the selected Roshko/Strouhal curve.

10 Claims, 4 Drawing Sheets

(56) References Cited

U.S. PATENT DOCUMENTS

2005/0283329 A1  12/2005  Payne
2010/0230437 A1  9/2010  Carapelli

FOREIGN PATENT DOCUMENTS

WO  03067199 A2  8/2003
WO  2006007118 A2  1/2006

* cited by examiner

VISCOSITY DEPENDENT FLOW METER FOR USE IN FUEL DISPENSING ENVIRONMENTS

PRIORITY CLAIM

The present application is based upon and claims the benefit of U.S. provisional application Ser. No. 61/787,250, filed Mar. 15, 2013, incorporated herein by reference in its entirety for all purposes.

BACKGROUND OF THE INVENTION

The present invention relates generally to turbine flow meters for use in fuel dispensing environments. More particularly, the invention relates to a turbine flow meter adapted to have enhanced accuracy across a range of fluids with varying viscosities.

Examples of turbine flow meters are shown and described in U.S. Pat. Nos. 8,381,597, 8,096,446, 6,854,342, 6,692,535, 5,831,176 and 5,689,071 (each of which is incorporated herein by reference in its respective entirety for all purposes). A turbine flow meter can be used to measure the flow rate of a liquid, which can be used to derive the volume of the liquid that has passed through the meter. In some such meters, two turbine rotors are positioned in a meter housing along the liquid flow path. As liquid passes across the rotors, they rotate. The liquid passes through the first turbine rotor and is directed into the second turbine rotor such that the second turbine rotor rotates in a direction opposite from the first turbine rotor.

During calibration of the turbine flow meter, a known volumetric flow rate of liquid is typically passed through the meter. The rotational frequency of the turbine rotors is measured at various flow rates and frequencies to arrive at a combined "Strouhal" number. The combined Strouhal number is the frequency of the rotor(s) A and B (FA and FB) divided by the volumetric flow rate (Vf) as follows:

$$Strouhal = \frac{FA + FB}{Vf}$$

The combined "Roshko" number for each of the Strouhal numbers is determined by dividing the sum of frequencies (FA+FB) by the viscosity (v) of the liquid, as follows:

$$Roshko = \frac{FA + FB}{v}$$

The Strouhal and corresponding Roshko numbers are plotted on a Roshko-Strouhal (R-S) curve and/or are stored in an array of finite points with the Strouhal numbers being plotted in one axis or an array, typically in the y-axis, and the corresponding Roshko numbers being stored in another axis or corresponding array, typically the x-axis. During operation, the R-S curve is used to determine a Strouhal number from a calculated Roshko number as discussed below.

First, the rotational frequencies of the turbine rotors are measured. As is known in the art, pick-off coils or other sensing devices, such as Hall-effect sensors, are employed in the turbine meter to detect the rotation of the turbine rotors. The sensors detect the movement of each blade on the turbine rotor and can therefore determine the frequency of rotation. Once the rotation frequencies of the turbine rotors are measured, the Roshko number can be determined according the formula for the Roshko number shown above. After the Roshko number is calculated, the corresponding Strouhal number is determined. The Strouhal number and the frequency of the turbine rotor are then used to determine the volumetric flow rate according to the rearranged Strouhal formula below:

$$Vf = \frac{FA + FB}{Sr}$$

The volumetric flow rate calculation is repeated continuously so that the volumetric flow rate of liquid flowing through the turbine meter is known at any given time. The volume of the liquid can be derived from the volumetric flow rate using time as is well known.

If the turbine flow meter is used in an application in which the liquid flow is of varying viscosities, such as in a fuel dispenser, it can be more difficult to accurately measure flow rate and volume. In known systems, a single Roshko/Strouhal curve is used by assuming a "standard" viscosity. Although the use of standard viscosity may be effective at higher flow rates, it may introduce significant error into the volumetric measurements at low flow rates (e.g., less than 2 gpm). This is because differences in viscosity result in smaller Roshko/Strouhal differences at higher flow rates rather than at lower flow rates.

Those skilled in the art will appreciate the scope of the present invention and realize additional aspects thereof after reading the following detailed description of the preferred embodiments in association with the accompanying drawing figures.

SUMMARY OF THE INVENTION

According to one aspect, the present invention provides a method of measuring volumetric flow through a meter. One step of the method involves providing a flow meter connected to a duct (i.e., flow passage) having fluid flowing therethrough. A memory having at least two Roshko/Strouhal curves stored therein is also provided. A viscosity of the fluid is measured. One of the Roshko/Strouhal is selected curves based on the measured viscosity. A volumetric flow through the meter is determined utilizing the selected Roshko/Strouhal curve.

Another aspect of the present invention provides a turbine flow meter including a controller in which multiple calibration curves corresponding to multiple viscosities are stored. During use, a actual viscosity is determined during valid flow, and is used to select a calibration curve.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
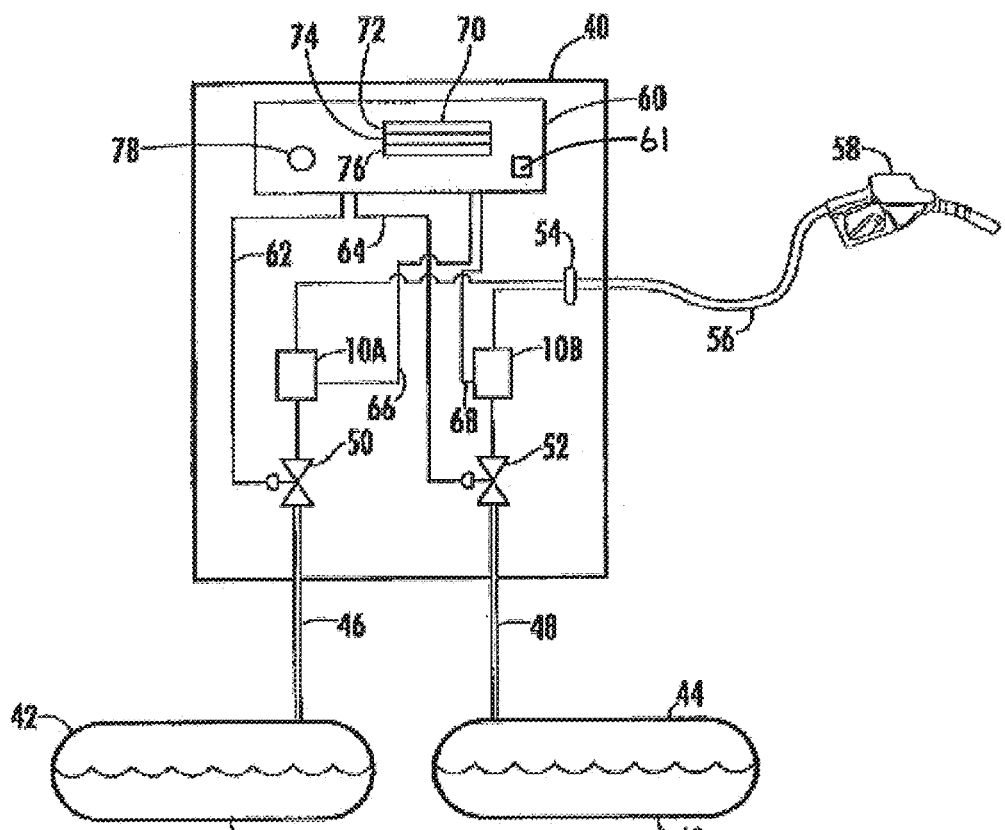
FIG. 1 is a diagram of a fuel dispenser using a pair of turbine flow meters constructed in accordance with an embodiment of the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a pair of turbine flow meters 10A and 10B in a fuel dispenser 40. The purpose of a fuel dispenser 40 is to dispense and measure fuel delivered to a vehicle (not shown). Accurate meters are required to measure fuel dispensing to comply with Weights & Measures regulatory requirements.

Fuel dispenser 40 may be a blending type fuel dispenser wherein a low-octane fuel 41 stored in a low-octane underground storage tank 42 and a high-octane fuel 43 stored in a high-octane underground storage tank 44 are blended together by fuel dispenser 40 to deliver either a low-octane fuel 41, high-octane fuel 43, or a mixture of both to a vehicle. Low-octane fuel 41 is supplied to fuel dispenser 40 through a low-octane fuel supply conduit 46. Likewise, high-octane fuel 43 is delivered to fuel dispenser 40 through a high-octane fuel supply conduit 48. Both low-octane fuel 41 and high-octane fuel 43 pass through fuel dispenser 40 in their own independent flow paths. Each fuel 41, 43 encounters a respective valve 50, 52 that controls whether the fuel is allowed to enter into fuel dispenser 40, and if so at what flow rate. Valves 50, 52 may be proportionally controlled and may be under the control of a controller 60 in fuel dispenser 40 via control lines 62, 64.

Controller 60 determines when a fueling operation is allowed to begin. Typically, a customer is required to push a start button 78 to indicate which octane of fuel 41, 43 is desired, and controller 60 thereafter controls valves 50, 52 to allow low-octane fuel 41 or high-octane fuel 43 (or both) to be dispensed, depending on the type of octane of fuel selected by the customer. After fuel 41, 43 passes through both valves 50, 52 (if a blended octane fuel was selected by the customer), fuels 41, 43 flow through turbine meters 10A, 10B. (If only a low-octane fuel 41 or high-octane fuel 43 was selected by the customer to be dispensed, controller 60 would only open one of the valves 50, 52.) As fuels 41, 43 flow through turbine meters 10A, 10B, sensors 29, 30 (FIG. 2) on each of turbine meters 10A, 10B produce a respective signal 66, 68 that is input into controller 60. Using the technique described herein, controller 60 determines the amount of flow of fuel flowing through turbine meters 10A, 10B for the purpose of determining the amount to charge a customer for delivery of such fuel. Controller 60 uses the data from the signals 66, 68 to generate a totals display 70. Totals display 70 comprises an amount to be charged to the customer display 72, the quantity of gallons (or liters) dispensed display 74, and the price per unit of fuel display 76.

Also, U.S. Pat. No. 4,876,653 entitled "Programmable multiple blender" describes a blender operation like that illustrated in FIG. 1 and is incorporated herein by reference in its entirety for all purposes. As either low octane fuel 41, high-octane fuel 43, or both pass through their respective turbine meters 10A, 10B, the fuels come together in the blend manifold 54 to be delivered through a hose 56 and nozzle 58 into the vehicle.

In other embodiments, meter 10 may be used in a vent stack of a underground storage tank at a service station. It may be desirable to measure the amount of air flowing through a vent stack using meter 10 to determine how often and how much air is separated by a membrane and released to atmosphere for any number of diagnostic or information purposes. The membrane may either permeate hydrocarbons or permeate oxygen or air as disclosed in U.S. Pat. Nos. 5,464,466 and 5,985,002, each of which is incorporated herein by reference in their entirety for all purposes. In other embodiments, meter 10 may measure the amount of vapor being returned to the underground storage tank in a Stage II vapor recovery system.

Figure 2:
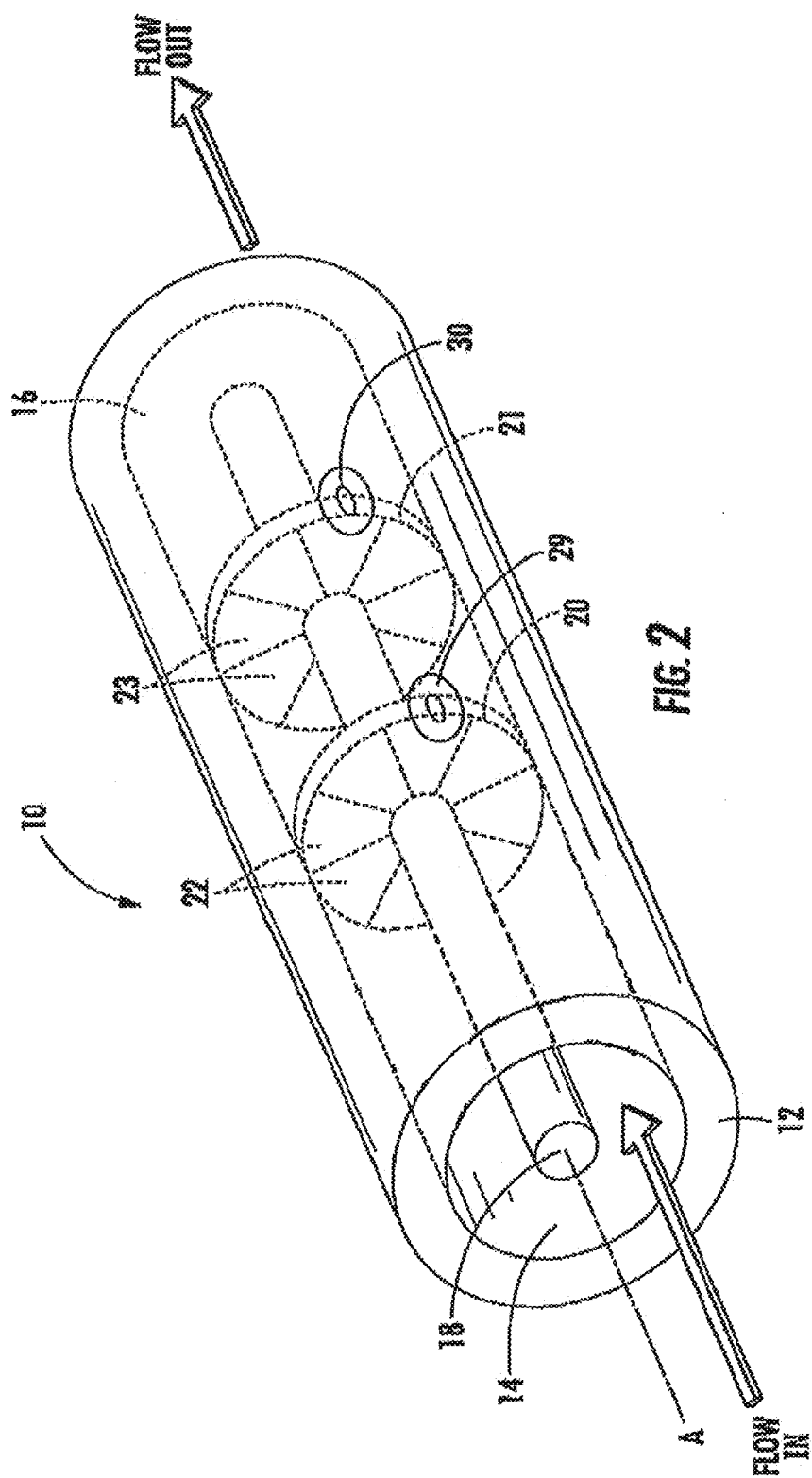
FIG. 2 is a perspective diagrammatic view of a turbine flow meter constructed in accordance with an embodiment of the present invention.

FIG. 2 illustrates meter 10 constructed in accordance with an embodiment of the present invention. Meter 10 includes a housing 12 that forms an inlet port 14 and an outlet port 16 for ingress and egress of fluid (liquid or gas), respectively. A stationary shaft 18 is located inside of housing 12 to support a pair of turbine rotors 20 and 21 that rotate in a plane perpendicular to the axis of shaft 18. Generally, a bearing set will be interposed between each of the rotors and the shaft 18 to facilitate the respective rotor's rotation. As shown, rotor 20 is located slightly upstream of rotor 21. Accordingly, rotor 20 may be referred to as the "first turbine rotor" (rotor A) with rotor 21 being referred to as the "second turbine rotor" (rotor B).

Figure 3:
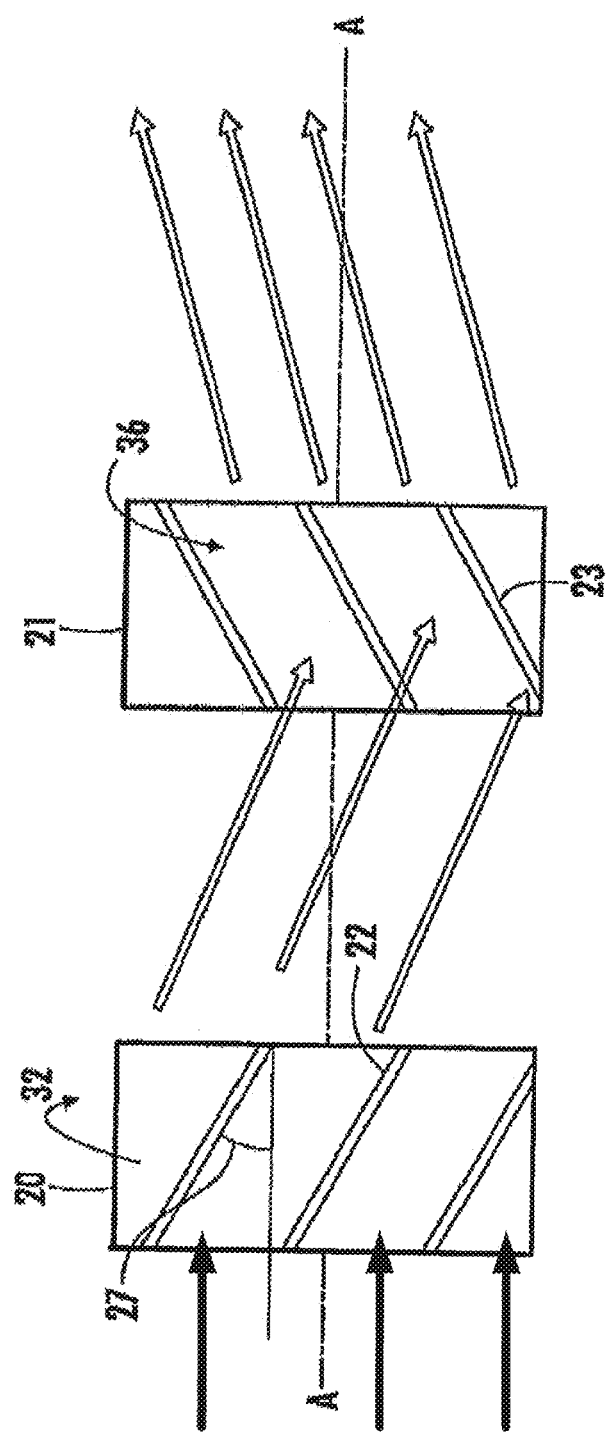
FIG. 3 is an illustration of a flow pattern of a turbine flow meter constructed in accordance with the embodiment of FIG. 2.

Rotor 20 includes one or more vanes 22 (also known as blades) that cause rotation when impinged by the flowing fluid. Similarly, rotor 21 includes one or more vanes 23. Referring now also to FIG. 3, vanes 22 and 23 are preferably spaced evenly around the periphery of the respective rotor hub. In addition, vanes 22 of rotor 20 are preferably canted oppositely from vanes 23 of rotor 21. This orientation of vanes 22 and 23 causes the two rotors to rotate in opposite directions (shown by arrows 32 and 36) at a rotational speed proportional to the fluid flow rate. For example, a controller can determine the ratio of the rotation speed of one turbine rotor to the other in order to determine the fluid flow rate.

In the illustrated embodiment, fluid entering housing 12 through inlet port 14 will encounter rotor 20. Because vanes 22 are canted, the straight fluid flow is converted into a generally swirling pattern with an angular trajectory based on angle 27 of vanes 22. This angular trajectory is generally oblique to the longitudinal axis of meter 10 (shown as "A-A"). After passing through rotor 20, the fluid impinges vanes 23 of rotor 21. The angular trajectory of the flow due to rotor 20 increases the fluid's angle of incidence with vanes 23. As the angle of incidence increases, the driving force used to impart rotational movement on turbine rotor 21 also increases.

The rotational speeds of rotor 20 and rotor 21 are determined by counting the vanes 22 and 23 passing by respective sensors 29 and 30 mounted to housing 12. In some embodiments, the ratio of the respective rotational speeds may be used to determine the flow rate of the liquid or gas passing through the meter 10. Instead of sensors 29 and 30, any other suitable technique for detecting the rotation of the rotors 20 and 21 may be used.

In some embodiments, sensors 29 and 30 are pickoff coils that generate a magnetic signal which penetrates through housing 12 to reach the turbine rotors 20 and 21. As the rotors 20 and 21 rotate, vanes 22 and 23 superimpose a pulse signal on the magnetic signal generated by pickoff coils 29 and 30. The pulse signal may then be delivered to controller 60. Controller 60 uses the pulse information to determine the frequency (Fr) of the rotor(s). At lower flow rates, rotor 20 may not be spinning. In such instances, the frequency of rotor 21 may be used by controller 60. Controller 60 also determines the viscosity (v) of the fluid flowing through meter 10 using any acceptable technique, such as a viscosity sensor.

Figure 4:
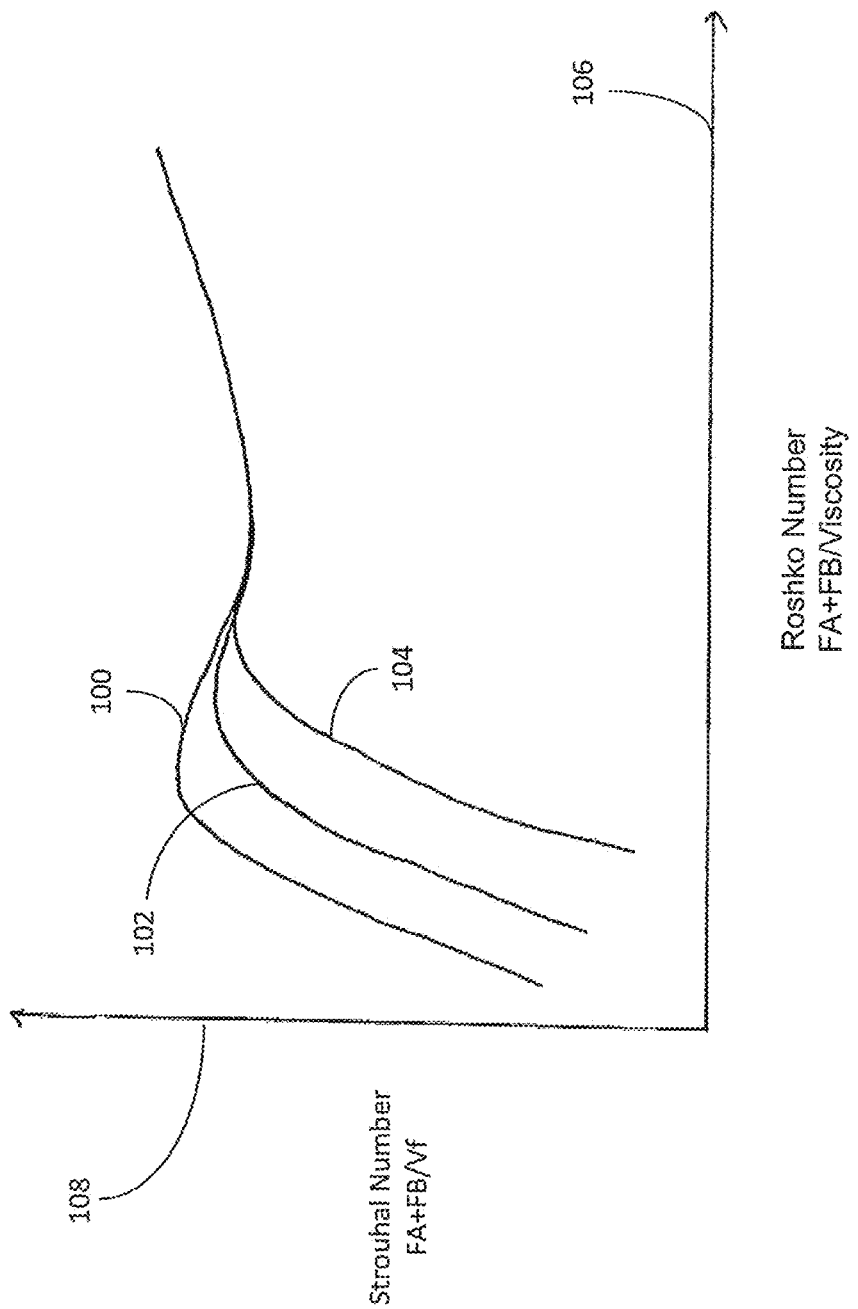
FIG. 4 is a graphical representation of Roshko-Strouhal (R-S) curves that may be utilized with the flow meter of FIG. 2.

As shown in FIG. 4, multiple R-S curves are stored in memory 61 associated with the meter and, preferably, with controller 60. The R-S curves 100, 102, and 104 are shown in a graphical representation of a line in two-dimensions, where for a given Roshko number in the x-axis 106, a corresponding Strouhal number in the y-axis 108 can be ascertained.

Each R-S curve shown in FIG. 4 corresponds to a different fluid viscosity. For instance, curve 102 represents a R-S curve with a first viscosity, curve 102 represents a R-S curve with a second viscosity, and curve 104 represents a R-S curve with a third viscosity. The number of curves stored in memory is limited only by practical limitations, such as memory space and processing speed. It is desirable to have a large number of R-S curves stored into memory. Therefore, certain embodiments will contain more than the three R-S curves displayed in FIG. 4.

The range of viscosities represented by the R-S curves will typically include the values of viscosities to be expected during fueling applications. These differing R-S curves are produced during the calibration process. It is understood that the R-S curves ray be produced using different techniques during calibration. For instance, in some embodiments process fluids with differing viscosities may be used to ascertain the R-S curves. In other embodiments the same process fluid may be used throughout the calibration process but at varying temperatures and utilizing some temperature compensation. At lower flow rates, the curves may be determined using only FB (which may be the only one available as FA is zero at low flow rates). The combined Roshko number is preferably used for higher flow rates.

During operation, the viscosity (v) of the fluid flowing through meter 10 is measured during a valid flow rate (as soon as FA>0). Based on measured viscosity (v) of the fluid flowing through meter 10, controller 60 determines the R-S curve that represents that particular viscosity. In the event a R-S curve representing the measured viscosity is not stored in memory, controller 60 will preferably select the R-S curve representing the viscosity of a fluid that is closest to the measured viscosity. One skilled in the art would appreciate that by increasing the number of R-S curves stored in memory, the overall accuracy of the meter will tend to improve.

The selected R-S curve can then be used to determine the volumetric flow rate (Vr) of the liquid flowing through the meter and in turn calculate the volume (V) of the liquid. To determine volumetric flow rate (Vr), controller 60 utilizes the R-S curve representative of the viscosity closest to the measured viscosity of the flowing fluid. The Roshko number can then be determined according the rotor frequency and fluid viscosity, as shown in the formula for the Roshko number shown above. Viscosity (v) in the denominator will vary for each curve stored in memory. After the Roshko number is calculated, the corresponding Strouhal number is determined using the selected R-S curve or equation. The Strouhal number and the frequency of the turbine rotor are then used to determine the volumetric flow rate according to the equation discussed above.

The volumetric flow rate calculation is repeated continuously in periodic time increments so that the volumetric flow rate of liquid flowing through the turbine meter is known at any given time. The volume of the liquid can be derived from the volumetric flow rate using time as is well known. In the example of a fuel dispenser such as the dispenser shown in FIG. 1, the volume (V) of liquid can then be communicated to a control system or other electronic circuitry to display the volume of fuel dispensed on the dispenser.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

I claim:

1. A method of measuring volumetric flow through a meter, comprising the steps of:
   providing a flow meter connected to a duct having fluid flowing therethrough;
   providing a memory having at least two Roshko/Strouhal curves stored therein;
   measuring a viscosity of said fluid;
   selecting one of said Roshko/Strouhal curves based on said viscosity; and
   calculating a volumetric flow through said meter utilizing said selected Roshko/Strouhal curve.

2. The method of claim 1, wherein said flow meter is a dual turbine flow meter.

3. The method of claim 2, wherein said at least two Roshko/Strouhal curves are derived from at least two fluids having differing viscosities.

4. The method of claim 3, wherein said dual turbine flow meter comprises an upstream rotor and a downstream rotor.

5. The method of claim 4, wherein said selecting a Roshko/Strouhal curve occurs when said upstream rotor is not rotating.

6. The method of claim 1, wherein said volumetric flow is based on a rotation speed of said downstream rotor and said viscosity of said fluid.

7. A turbine flow meter apparatus for determining flow rate of a fluid, said flow meter comprising:
   a housing defining a flow path between an inlet port and an outlet port;
   first and second turbine rotors rotatably supported in said flow path;
   at least one sensor configured to detect rotation of said first and second rotors;
   a controller operative to receive signals from said at least one sensor indicative of the rotation;
   said controller further operative to receive an indication of a measured viscosity of said fluid;
   a memory associated with said controller storing multiple calibration curves corresponding to multiple viscosities; and
   said flow meter being operative to select one of said calibration curves based on said viscosity.

8. A turbine flow meter apparatus as set forth in claim 7, wherein said one of said calibration curves corresponds most closely to the measured viscosity.

9. A turbine flow meter apparatus as set forth in claim 7, wherein said controller uses said one of said calibration curves to determine a flow rate of said fluid.

10. A turbine flow meter apparatus as set forth in claim 7, wherein said calibration curves are Roshko/Strouhal curves.

\* \* \* \* \*